Patented Mar. 26, 1929.

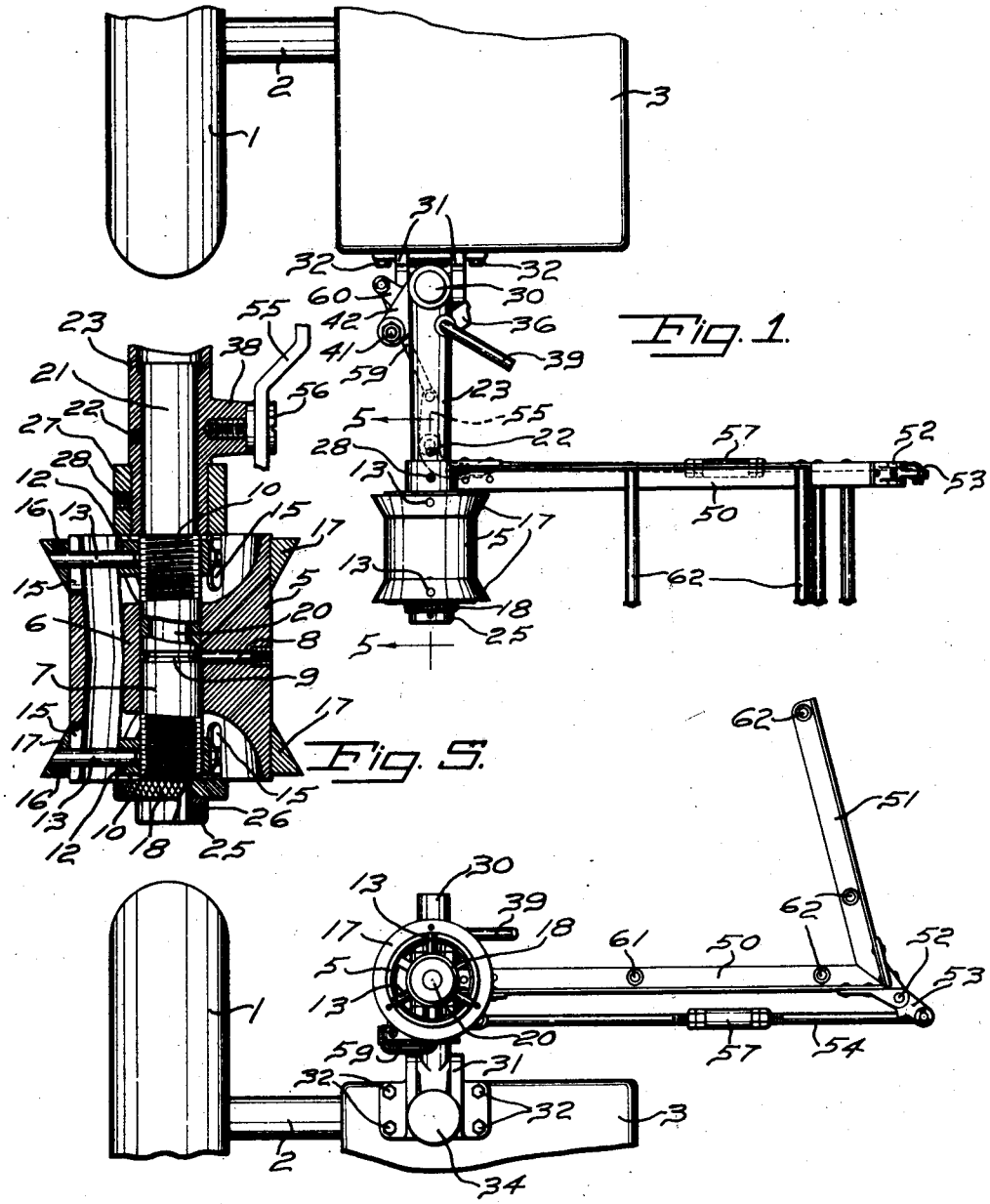

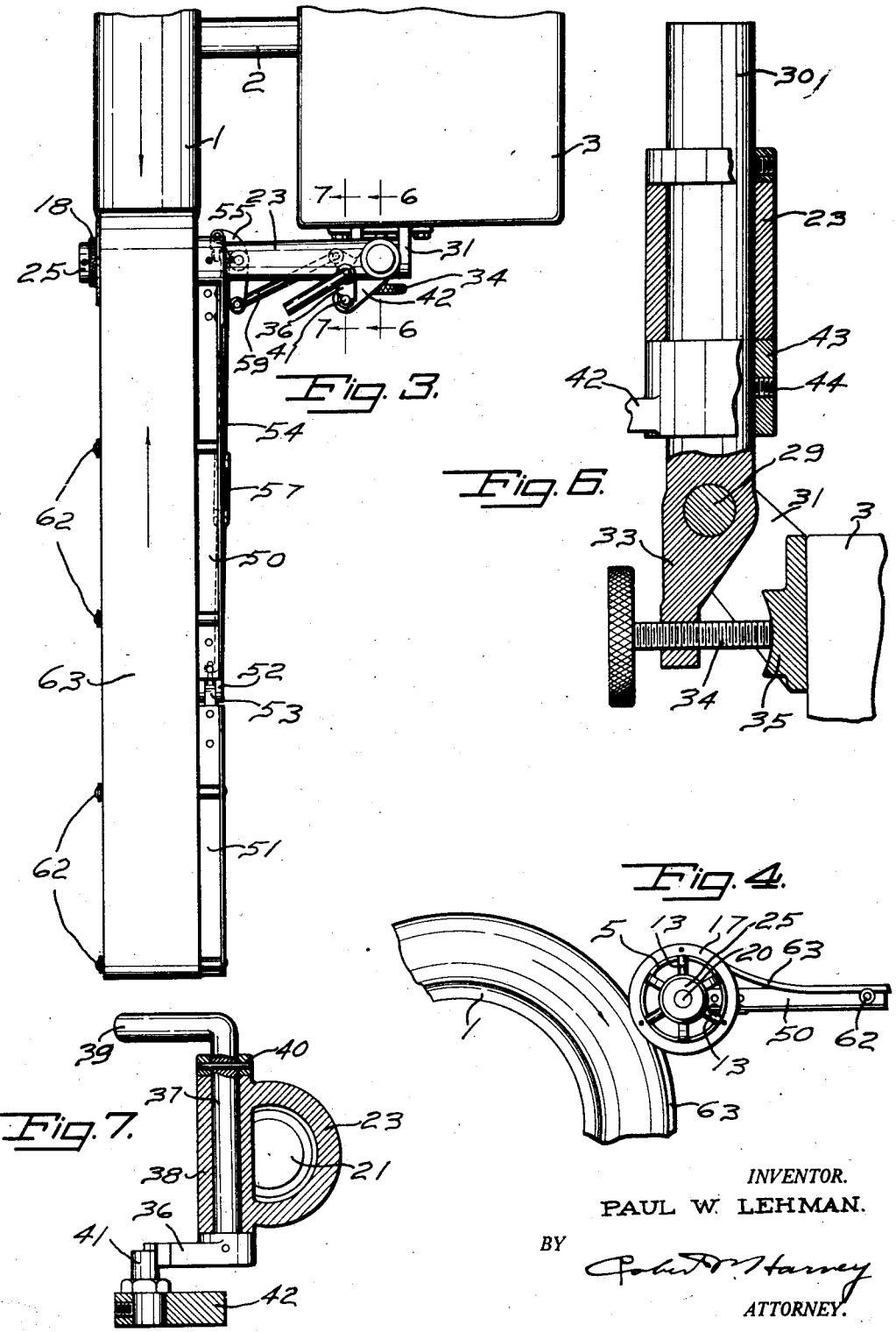

1,706,698

UNITED STATES PATENT OFFICE.

PAUL W. LEHMAN, OF MILWAUKEE, WISCONSIN, ASSIGNOR TO THE FISK RUBBER COMPANY, OF CHICOPEE FALLS, MASSACHUSETTS, A CORPORATION OF MASSACHUSETTS.

TREAD-APPLYING MECHANISM.

Application filed November 11, 1927. Serial No. 232,520.

My invention relates to tire building machines and more particularly to an improved device for applying the treads to the tire carcass while the latter is positioned on the building core. In my copending application, Serial No. 140,569, filed October 9, 1926, I have disclosed and claimed a method of, and apparatus for, performing this operation. My present invention has for its object certain improvements in the tread applying and gauging roll and the means for guiding the tread to the roll as will be apparent from the following specification and claims:

In the accompanying drawings which illustrate one embodiment of the invention,

Fig. 1 is a plan view showing the parts in inoperative position,

Fig. 2 is a front elevation of the structure shown in Fig. 1,

Fig. 3 is a plan view showing the parts in operative relation with respect to the core.

Fig. 4 is a fragmentary side view of parts as shown in Fig. 3,

Fig. 5 is a section on line 5—5 of Fig. 1,

Fig. 6 is a section on line 6—6 of Fig. 3, and

Fig. 7 is a section on line 7—7 of Fig. 3.

Referring to the drawings, 1 designates the rotatable core of a tire building machine, upon which the tire carcass is formed and which serves as a support for the latter while the tread is applied. The core 1 is secured to a shaft 2 which is driven by any suitable type of power unit enclosed in a housing 3.

The tread applying and gauging roll comprises a cylindrical body portion 5 formed with a central hub 6. A sleeve 7 is fitted in hub 6 and the latter is held against longitudinal movement on the sleeve by means of a pin 8 running in a groove 9 formed in the sleeve. The sleeve is reversely threaded at its ends, as indicated at 10, to receive carrier nuts 12 which are provided with axially extending pins 13 extending through slots 15, formed in the edges of roll 5. Pins 13 are secured, as by set screws 16, to flange rings 17 slidingly fitted on the surface of the roll. Sleeve 7 is formed at its outer end with a knurled head 18 by means of which it may be rotated with respect to the roll 5 causing carrier nuts 12 to move towards or from each other and thereby moving flange rings toward or from each other on the surface of the roll. It will be understood that the slope of flange rings 17 together with the surface of roll 5 will be such as to conform substantially to the contour of the tread to be applied, the flanges engaging the shoulders of the tread, and that the adjusting means just described permits the roll to be quickly adapted to different widths of treads.

The roll 5 is mounted for free rotation on reduced portion 20 of a stub shaft 21 secured by a set screw 22 in a supporting arm 23, and is held in position on the shaft by means of a collar 25 secured to the end of the shaft by a set screw 26 and a collar 27 secured to arm 23 by a set screw 28. Arm 23 is pivoted, for swinging movement in a substantially horizontal plane, on a vertical shaft 30 which in turn is pivoted at 29 between lugs 31 secured to housing 3 as by bolts 32. Shaft 30 is extended beyond pivot 29 to form a lug 33 through which is threaded a screw 34, the end of which engages an abutment 35 formed between lugs 31.

The arm 23 is releasably locked in operative position as shown in Fig. 3, by a latch 36 secured to the lower end of a vertical rod 37, journaled in a boss 38 formed on arm 23. The upper end of rod 37 is bent to form a handle 39 and the rod is held in place in the boss by a collar 40. When the parts are in the position shown in Fig. 3 latch 36 is adapted to be brought into contact with a pin 41 adjustably secured in a bracket 42 formed integral with a collar 43 secured to shaft 30 by a set screw 44, see Figs. 3 and 6, to hold roll 5 in fixed spaced relation with the building core.

Since the applying and gauging roll and its support are adapted to be adjusted to operate on large as well as small tires it is necessary to provide a tread support that will accommodate the longest tread to be applied. To accomplish this I provide an arm 50 rigidly secured to collar 27 and hinge an extension 51 to the free end of arm 50 at 52, that portion of the hinge which is secured to the extension 51 being provided with a lug 53 connected by a rod 54 to one arm of a bellcrank 55 pivoted to member 23 at 56. Rod 54 is made adjustable in length as by a turn buckle 57. The other end of the bellcrank 55 is connected by a link 59 to a lug 60 formed on bracket 42. When the applying device is in inoperative position as shown in Figs. 1 and 2 extension 51 is in substantially vertical position, thus confining the tread support to a small compass and preventing interference with the other tire building operations. When the applying device is swung to operative position shown in Fig. 1, link 59, bellcrank 55 and rod 54 operate, as will be clear from Fig. 3, to bring the extension 51 into alignment with arm 50. The arm 50 and extension 51 are provided with horizontally extending anti-friction rolls 62 adapted to support the tread 63 as the latter is applied to the carcass by the gauging roll 5, see Fig. 4.

As above stated, the device of my present invention is designed to carry out the method of my above-mentioned copending application, that is, the application of a tread cut to weight by applying it to the carcass by means of a roll held in a predetermined spaced relation to the carcass and its core such that the tread as it is applied is brought to a gauge (in effect stretching the tread rearwardly) so that the given weight of tread exactly covers the circumference of the carcass. In the present device the manipulation of screw 34 permits the ready adjustment of the spacing of roll 5 from the core to accommodate the various sizes of tires and different tread gauges and the adjustable spacing of guiding flanges 17 accommodate the various widths of treads. It will be understood that the shape and inclination of the rings 17 as well as the surface of roll 5 may be varied to suit the shape of tread used.

Having thus described my invention, I claim:

1. A device of the character described comprising a freely rotatable roll mounted to be moved into a predetermined spaced relation with respect to a rotatable tire building core and adapted to reduce the tread thickness to a predetermined gauge as the tread is applied to a tire carcass supported on the core, said roll being adjustable to accommodate various widths of treads, and an extensible support associated with the roll to position the tread substantially in the plane of the roll.

2. A device of the character described comprising a freely rotatable roll mounted to be moved into a predetermined spaced relation with respect to a rotatable tire building core and adapted to reduce the tread thickness to a predetermined gauge as the tread is applied to a tire carcass supported on the core, said roll being provided with movable flanges shaped to conform substantially to the cross-sectional profile of the tread, means to adjust the spacing of the flanges on the roll to accommodate treads of various widths, and an extensible support associated with the roll to position the tread substantially in the plane of the roll.

3. A device of the character described comprising a freely rotatable roll mounted to be moved into a predetermined spaced relation with respect to a rotatable tire building core and adapted to reduce the tread thickness to a predetermined gauge as the tread is applied to a tire carcass supported on the core, said roll being adjustable to accommodate treads of various widths, a support associated with the roll to position the tread substantially in the plane of the roll, said support being formed with a hinged portion positioned at an angle to the body of the support when the roll is in inoperative position and means operative when the roll is moved to operative position with respect to the core to swing the hinged position into alignment with the body of the support.

4. A device of the character described comprising a freely rotatable roll mounted to be moved into a predetermined spaced relation with respect to a rotatable tire building core and adapted to reduce the tread thickness to a predetermined gauge as the tread is applied to a tire carcass supported on the core, said roll being provided with movable flanges shaped to conform substantially to the cross-sectional profile of the tread, means to adjust the spacing of the flanges on the roll to accommodate treads of various widths, a support associated with the roll to position the tread substantially in the plane of the roll, said support being formed with a hinged portion positioned at an angle to the body of the support when the roll is in inoperative position and means operative when the roll is moved to operative position with respect to the core to swing the hinged position into alignment with the body of the support.

5. In combination a tread applying roll, a support associated therewith, said support being formed with a hinged portion positioned at an angle to the body of the support when the roll is in inoperative position and means operative when the roll is moved to operative position with respect to the core to swing the hinged portion into alignment with the body of the support.

6. A tread applying roll comprising a sleeve having oppositely running threads at its ends, a roll having a central hub rotatably mounted on the central portion of the sleeve, carrier nuts mounted on the threaded ends of the sleeves, slots formed in the edges of the roll, spokes passing through said slots and secured to the carrier nuts, flanges slidably fitted on the face of the roll and secured to the outer ends of the spokes, and means to rotate the sleeve with reference to the roll to move the flanges toward and from each other along the face of the roll.

PAUL W. LEHMAN.